United States Patent
Hao

(10) Patent No.: US 10,147,369 B2
(45) Date of Patent: Dec. 4, 2018

(54) DRIVING METHOD FOR LIQUID CRYSTAL DISPLAY PANEL

(71) Applicant: Shenzhen China Star Optoelectronics Semiconductor Display Technology Co., Ltd., Shenzhen (CN)

(72) Inventor: Sikun Hao, Shenzhen (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 0 days.

(21) Appl. No.: 15/514,827

(22) PCT Filed: Mar. 10, 2017

(86) PCT No.: PCT/CN2017/076316
§ 371 (c)(1),
(2) Date: Mar. 28, 2017

(87) PCT Pub. No.: WO2018/152873
PCT Pub. Date: Aug. 30, 2018

(65) Prior Publication Data
US 2018/0240417 A1 Aug. 23, 2018

(30) Foreign Application Priority Data
Feb. 22, 2017 (CN) .......................... 2017 1 0096445

(51) Int. Cl.
*G09G 3/36* (2006.01)
*G02F 1/1362* (2006.01)

(52) U.S. Cl.
CPC ..... *G09G 3/3607* (2013.01); *G02F 1/136286* (2013.01); *G09G 3/3648* (2013.01); *G09G 2300/0452* (2013.01); *G09G 2310/0289* (2013.01)

(58) Field of Classification Search
CPC ................ G09G 3/3607; G09G 3/3648; G06F 1/136286
USPC ...... 345/87, 100, 14, 206, 691–694; 257/40; 359/462
See application file for complete search history.

(56) References Cited

U.S. PATENT DOCUMENTS

| | | | | |
|---|---|---|---|---|
| 7,180,495 B1* | 2/2007 | Matsueda | ............ | G09G 3/3233 345/100 |
| 2007/0109286 A1* | 5/2007 | Nakamura | ............ | G06F 3/0412 345/204 |
| 2008/0150859 A1* | 6/2008 | Song | .................... | G09G 3/3648 345/87 |
| 2009/0195495 A1* | 8/2009 | Hsu | ....................... | G09G 3/3607 345/104 |
| 2010/0103206 A1* | 4/2010 | Kamada | ............... | G09G 3/3607 345/690 |
| 2010/0118045 A1* | 5/2010 | Brown Elliott | .... | G02B 27/2214 345/589 |

(Continued)

*Primary Examiner* — Prabodh M Dharia

(57) ABSTRACT

A method for driving a liquid crystal display panel includes dividing a plurality of sub-pixels in the same column into three sub-pixel groups, which comprises a first sub-pixel group, a second sub-pixel group, and a third sub-pixel group; and sequentially charging K sub-pixels in each sub-pixel group in the order of the first sub-pixel group, the second sub-pixel group, and the third sub-pixel group until all of the corresponding sub-pixels in each sub-pixel group are charged.

18 Claims, 7 Drawing Sheets

(56) References Cited

U.S. PATENT DOCUMENTS

| | | | | |
|---|---|---|---|---|
| 2012/0154358 A1* | 6/2012 | Chen | ............... | G09G 3/3614 345/209 |
| 2013/0135719 A1* | 5/2013 | Tsai | ............... | G02B 27/2214 359/462 |
| 2015/0144893 A1* | 5/2015 | Chen | ............... | H05B 33/0896 257/40 |
| 2015/0339972 A1* | 11/2015 | Xu | ............... | G09G 3/3225 345/206 |
| 2016/0155407 A1* | 6/2016 | Gass | ............... | G09G 3/3648 345/691 |
| 2016/0299391 A1* | 10/2016 | Liu | ............... | G02F 1/134336 |
| 2016/0334684 A1* | 11/2016 | Li | ............... | G02F 1/133514 |
| 2017/0193929 A1* | 7/2017 | Chen | ............... | G09G 3/3607 |
| 2017/0363918 A1* | 12/2017 | Lin | ............... | G02F 1/134336 |

\* cited by examiner

DRIVING METHOD FOR LIQUID CRYSTAL DISPLAY PANEL

RELATED APPLICATIONS

This application is a National Phase of PCT Patent Application No. PCT/CN2017/076316 having International filing date of Mar. 10, 2017, which claims the benefit of of Chinese Patent Application No. 201710096445.8 filed on Feb. 22, 2017. The contents of the above applications are all incorporated by reference as if fully set forth herein in their entirety.

FILED AND BACKGROUND OF THE INVENTION

The present disclosure relates to the field of display technology, and particularly to a driving method for a liquid crystal display panel.

Currently, liquid crystal display (LCD) panels are the most widely used display panels for providing high-resolution color screens for a variety of electronic devices such as mobile phones, personal digital assistants (PDAs), digital cameras, computers, or notebooks.

Please Refer to FIG. 1, which is a schematic diagram of two driving architectures commonly used in conventional liquid crystal display panels. As shown in FIG. 1, the liquid crystal display panel 101 of the first driving architecture comprises a plurality of scanning lines G1 to G6 (only six scanning lines are schematically shown), a plurality of data lines D1-D2 (only two data lines are schematically shown), and a plurality of sub-pixels arranged in an array. The sub-pixels comprise a red sub-pixel R, a green sub-pixel G, and a blue sub-pixel B. The red sub-pixel R, the green subpixel G, and the blue subpixel B are alternately and repeatedly arranged in each column. The liquid crystal display panel 102 of the second driving architecture comprises a plurality of scanning lines G1 to G2 (only two scanning lines are schematically shown), a plurality of data lines D1-D6 (only six data lines are schematically shown), and a plurality of sub-pixels arranged in an array. The sub-pixels comprise a red sub-pixel R, a green sub-pixel G, and a blue sub-pixel B. The red sub-pixel R, the green subpixel G, and the blue subpixel B are alternately and repeatedly arranged in each column.

By using the first driving architecture, the number of scan lines can be increased threefold, and the number of data lines can be reduced to ⅓ of the original, thereby reducing the number of data lines of the source driver and reducing the cost of the source driver.

Please refer to FIG. 2 and FIG. 3. FIG. 2 is a green image schematic diagram of a conventional liquid crystal display using a first driving architecture; FIG. 3 is a wave schematic diagram displaying a green image on a conventional liquid crystal display by using a first driving architecture. However, in the first driving architecture, when the single color image (green image) is displayed, since the voltage value is always in the high-low variation state, the actual voltage value change curve S1 on the data line is different from the theoretical voltage value change curve S2. The pixel charge capacity is poor, which easily causes insufficient charge, resulting in poor image display and reducing display quality.

Therefore, it is necessary to provide a driving method for a liquid crystal display panel to solve the problems existing in the conventional art.

SUMMARY OF THE INVENTION

An object of the present disclosure is to provide a driving method for a liquid crystal display panel to solve the technical problems that the charging capacity of a pixel is poor and insufficient charge is provided because the voltage value is always in a high-low variation state when the single color image is displayed, resulting in poor image display and reducing the display quality.

The present disclosure provides a driving method for a liquid crystal display panel. The liquid crystal display panel comprises a plurality of sub-pixels arranged in an array. Each column of sub-pixels comprises a first sub-pixel, a second sub-pixel, and a third sub-pixel sequentially arranged alternately from the first row to the last row. The first sub-pixel is for displaying a first color, the second sub-pixel is for displaying a second color, and the third sub-pixel is for displaying a third color. The driving method comprises:

A plurality of sub-pixels in the same column are divided into three sub-pixel groups, the three sub-pixel groups comprise a first sub-pixel group composed of the first sub-pixels, a second sub-pixel group composed of the second sub-pixels, and a third sub-pixel group composed of the third sub-pixels.

K sub-pixels in each of the sub-pixel groups are sequentially charged in the order of the first sub-pixel group, the second sub-pixel group, and the third sub-pixel group until all of the corresponding sub-pixels in each sub-pixel group are charged, reducing the high-low level conversion frequencies of data lines when the liquid crystal display panel displays a single color image. K is an integer greater than one.

The first sub-pixel is a red sub-pixel, the second sub-pixel is a green sub-pixel, and the third sub-pixel is a blue sub-pixel.

The liquid crystal display panel further comprises a plurality of scanning lines and a plurality of data lines. Each scanning line is connected with one row of sub-pixels, and each data line is connected with one column of sub-pixels.

In the driving method for the liquid crystal display panel of the present disclosure, when the liquid crystal display panel displays a first color image, the data line applies a high level data signal when the scan lines connected to the first sub-pixel are turned on, and the data line applies a low level data signal when the scanning lines connected to the second sub-pixel and the third sub-pixel connection are turned on.

In the driving method for the liquid crystal display panel of the present disclosure, when the liquid crystal display panel displays a second color image, the data line applies a high level data signal when the scan lines connected to the second sub-pixel are turned on, and the data line applies a low level data signal when the scanning lines connected to the first sub-pixel and the third sub-pixel connection are turned on.

In the driving method for the liquid crystal display panel of the present disclosure, when the liquid crystal display panel displays a third color image, the data line applies a high level data signal when the scan lines connected to the third sub-pixel are turned on, and the data line applies a low level data signal when the scanning lines connected to the first sub-pixel and the second sub-pixel connection are turned on.

In the driving method for the liquid crystal display panel of the present disclosure, a first sub-pixel, a second sub-pixel, and a third sub-pixel sequentially arranged in the same column form a display pixel.

In the driving method for the liquid crystal display panel of the present disclosure, K first sub-pixels in the first sub-pixel group are first sub-pixels arranged successively.

In the driving method for the liquid crystal display panel of the present disclosure, K second sub-pixels in the second sub-pixel group are second sub-pixels arranged successively.

In the driving method for the liquid crystal display panel of the present disclosure, K third sub-pixels in the third sub-pixel group are third sub-pixels arranged successively.

The present disclosure further provides a driving method for a liquid crystal display panel. The liquid crystal display panel comprises a plurality of sub-pixels arranged in an array, each column of sub-pixels comprises a first sub-pixel, a second sub-pixel, and a third sub-pixel sequentially arranged alternately from the first row to the last row. The first sub-pixel is for displaying a first color, the second sub-pixel is for displaying a second color, and the third sub-pixel is for displaying a third color. The driving method comprises:

A plurality of sub-pixels in the same column are divided into three sub-pixel groups, the three sub-pixel groups comprise a first sub-pixel group composed of the first sub-pixels, a second sub-pixel group composed of the second sub-pixels, and a third sub-pixel group composed of the third sub-pixels.

K sub-pixels in each of the sub-pixel groups are sequentially charged in the order of the first sub-pixel group, the second sub-pixel group, and the third sub-pixel group until all of the corresponding sub-pixels in each sub-pixel group are charged, to reduce the high-low level conversion frequencies of data lines when the liquid crystal display panel displays a single color image. K is an integer greater than one.

In the driving method for the liquid crystal display panel of the present disclosure, the first sub-pixel is a red sub-pixel, the second sub-pixel is a green sub-pixel, and the third sub-pixel is a blue sub-pixel.

In the driving method for the liquid crystal display panel of the present disclosure, the liquid crystal display panel further comprises a plurality of scanning lines and a plurality of data lines. Each scanning line is connected with one row of sub-pixels, and each data line is connected with one column of sub-pixels.

In the driving method for the liquid crystal display panel of the present disclosure, when the liquid crystal display panel displays a first color image, the data line applies a high level data signal when the scan lines connected to the first sub-pixel are turned on, and the data line applies a low level data signal when the scanning lines connected to the second sub-pixel and the third sub-pixel connection are turned on.

In the driving method for the liquid crystal display panel of the present disclosure, when the liquid crystal display panel displays a second color image, the data line applies a high level data signal when the scan lines connected to the second sub-pixel are turned on, and the data line applies a low level data signal when the scanning lines connected to the first sub-pixel and the third sub-pixel connection are turned on.

In the driving method for the liquid crystal display panel of the present disclosure, when the liquid crystal display panel displays a third color image, the data line applies a high level data signal when the scan lines connected to the third sub-pixel are turned on, and the data line applies a low level data signal when the scanning lines connected to the first sub-pixel and the second sub-pixel connection are turned on.

In the driving method for the liquid crystal display panel of the present disclosure, a first sub-pixel, a second sub-pixel, and a third sub-pixel sequentially arranged in the same column form a display pixel.

In the driving method for the liquid crystal display panel of the present disclosure, K first sub-pixels in the first sub-pixel group are first sub-pixels arranged successively.

In the driving method for the liquid crystal display panel of the present disclosure, K second sub-pixels in the second sub-pixel group are second sub-pixels arranged successively.

In the driving method for the liquid crystal display panel of the present disclosure, K third sub-pixels in the third sub-pixel group are third sub-pixels arranged successively.

The driving method for a liquid crystal display panel of the present disclosure with a plurality of sub-pixels in the same column are divided into three sub-pixel groups, the three sub-pixel groups comprise a first sub-pixel group composed of the first sub-pixels, a second sub-pixel group composed of the second sub-pixels, and a third sub-pixel group composed of the third sub-pixels. K sub-pixels in each of the sub-pixel groups are sequentially charged in the order of the first sub-pixel group, the second sub-pixel group, and the third sub-pixel group until all of the corresponding sub-pixels in each sub-pixel group are charged, reducing the high-low level conversion frequencies of data lines when the liquid crystal display panel displays a single color image, and reducing the voltage level conversion frequency on the data line and improve the charge capacity of the pixels, thereby improving the display quality of the liquid crystal display panel.

In order to make the foregoing of the present disclosure more clear, the preferred embodiments are given hereinafter and are to be described in detail with reference to the accompanying drawings:

BRIEF DESCRIPTION OF THE SEVERAL VIEWS OF THE DRAWINGS

The technical proposals of the present disclosure and other advantageous effects will be apparent from the following detailed description of specific embodiments of the present disclosure taken in conjunction with the accompanying drawings.

DESCRIPTION OF SPECIFIC EMBODIMENTS OF THE INVENTION

The technical proposals and the effects thereof will be described in further detail with reference to the preferred embodiments of the present disclosure and their accompanying drawings. Obviously, the described embodiments are merely part of the present disclosure, and do not encompass all embodiments. All other embodiments obtained by those of ordinary skill in the art without making creative work are within the scope of the present disclosure, based on embodiments in the present disclosure.

The present disclosure provides a driving method for a liquid crystal display panel. The liquid crystal display panel comprises a plurality of sub-pixels arranged in an array, each column of sub-pixels comprises a first sub-pixel, a second sub-pixel, and a third sub-pixel sequentially arranged alternately from the first row to the last row. The first sub-pixel is for displaying a first color, the second sub-pixel is for displaying a second color, and the third sub-pixel is for displaying a third color. The driving method comprises:

A plurality of sub-pixels in the same column are divided into three sub-pixel groups, the three sub-pixel groups comprise a first sub-pixel group composed of the first sub-pixels, a second sub-pixel group composed of the second sub-pixels, and a third sub-pixel group composed of the third sub-pixels.

K sub-pixels in each of the sub-pixel groups are sequentially charged in the order of the first sub-pixel group, the second sub-pixel group, and the third sub-pixel group until all of the corresponding sub-pixels in each sub-pixel group are charged, reducing the high-low level conversion frequencies of data lines and improving the charge capacity of the sub-pixels, thereby improving the display quality of the liquid crystal display panel when the liquid crystal display panel displays a single color image. K is an integer greater than one. K first sub-pixels in the first sub-pixel group are first sub-pixels arranged successively. K second sub-pixels in the second sub-pixel group are second sub-pixels arranged successively. K third sub-pixels in the third sub-pixel group are third sub-pixels arranged successively.

Figure 1:
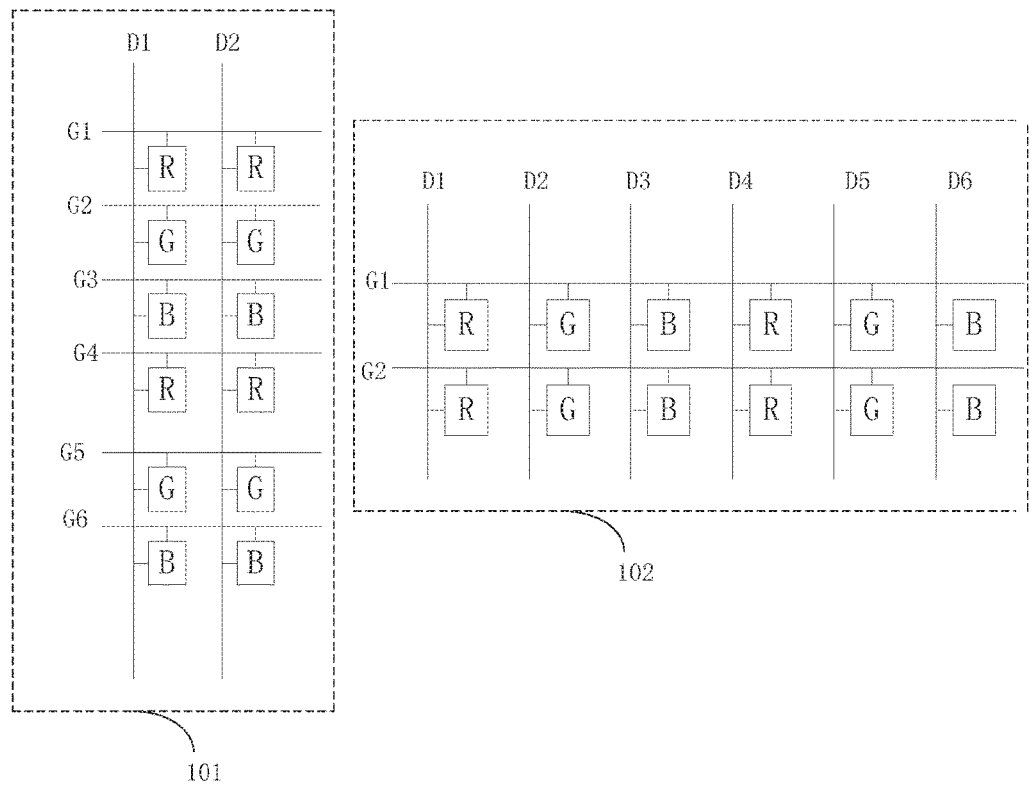
FIG. 1 is a schematic diagram of two driving architectures commonly used in conventional liquid crystal display panels.
Figure 2:
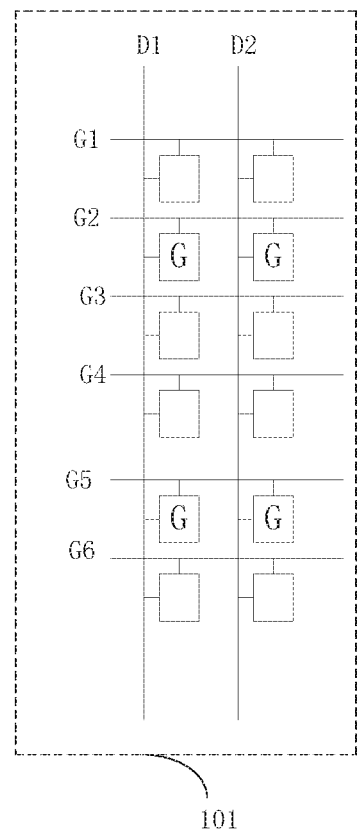
FIG. 2 is a green image schematic diagram of a conventional liquid crystal display using a first driving architecture.
Figure 3:
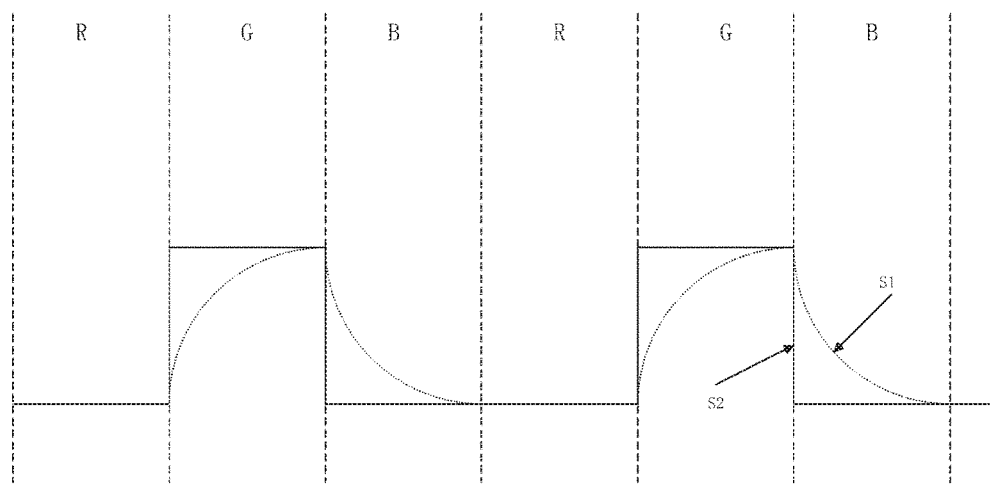
FIG. 3 is a wave schematic diagram displaying a green image on a conventional liquid crystal display using a first driving architecture.
Figure 4:
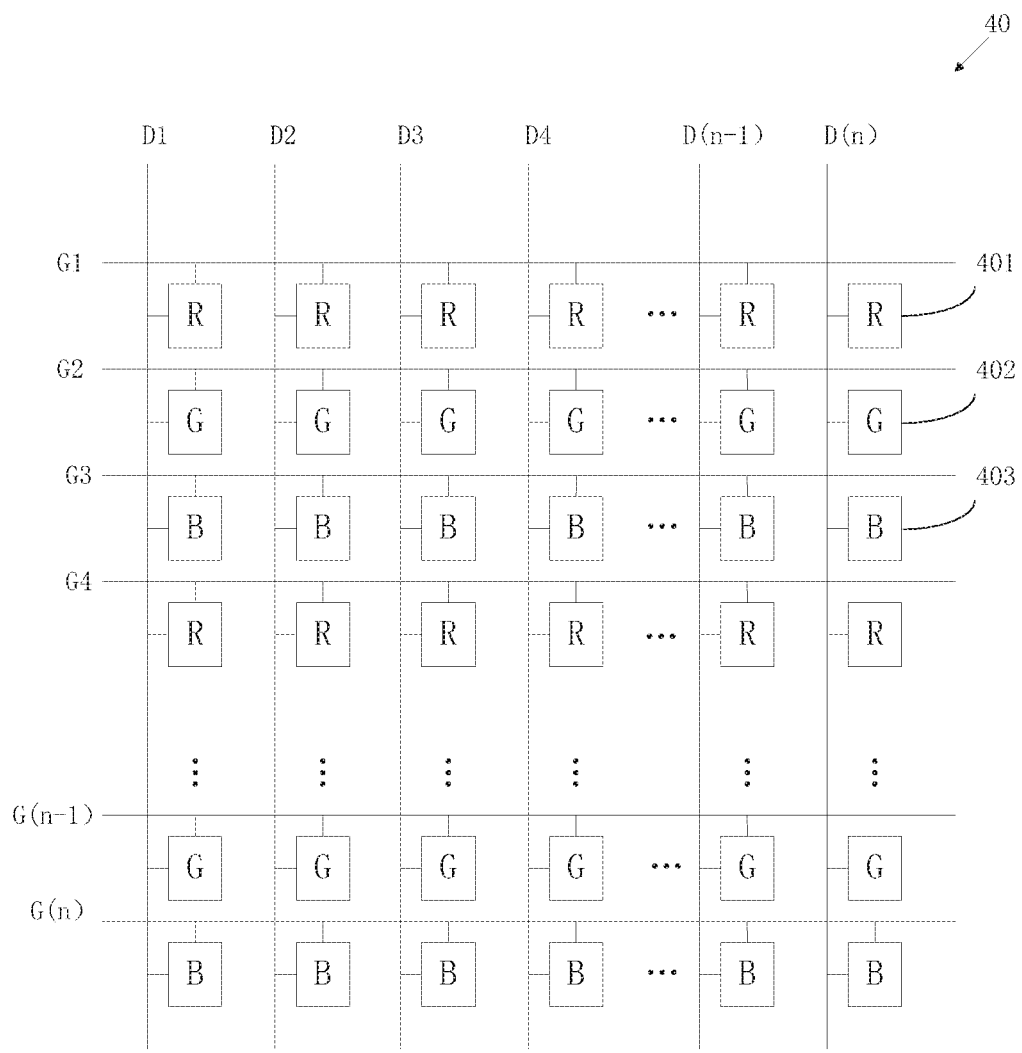
FIG. 4 is a schematic view of a driving architecture of a liquid crystal display panel of the present disclosure.

Please refer to FIG. 4, which is a schematic view of a driving architecture of a liquid crystal display panel of the present disclosure. The liquid crystal display panel 40 includes a plurality of scanning lines G1 to G(n), a plurality of data lines D1-D(n), and a plurality of sub-pixels. The scanning lines G1 to G(n) are sequentially arranged in the row direction, and the data lines D1 to D(n) are sequentially arranged in the column direction. Each scanning line is connected to one row of sub-pixels and each data line is connected to one column of sub-pixels.

Specifically, each of the sub-pixels comprises a first sub-pixel 401, a second sub-pixel 402, and a third sub-pixel 403, which are alternately arranged from the first row to the last row, and the first sub-pixel 401 is used to display the first color, the second sub-pixel 402 is used to display the second color, the third sub-pixel 403 is used to display the third color. First sub-pixels 401, second sub-pixels 402, and third sub-pixels 403, which are successively arranged in the same column, the three sub-pixels together constitute a display pixel.

Preferably, the first sub-pixel 401 is a red sub-pixel R, the second sub-pixel 402 is a green sub-pixel G, and the third sub-pixel 403 is a blue sub-pixel B. It is to be noted that the first sub-pixel 401, the second sub-pixel 402, and the third sub-pixel 403 of the liquid crystal display panel 40 of the present disclosure may be any of the red subpixel R, the green subpixel G, and the blue subpixel B, further, the first sub-pixel 401, the second sub-pixel 402, and the third sub-pixel 403 are sub-pixels that display different colors.

In the present disclosure, a plurality of sub-pixels of the same column are divided into three sub-pixel groups, which comprises a first sub-pixel group, a second sub-pixel group, and a third sub-pixel group. The first sub-pixel group is composed of the first sub-pixels 40, the second sub-pixel group is composed of the second sub-pixels 402, and the third sub-pixel group is composed of the third sub-pixels 403.

As an embodiment of the present disclosure, when the liquid crystal display panel is driven, two sub-pixels of each sub-pixel group are alternatively charged in the order of the first sub-pixel group, the second sub-pixel group, and the third sub-pixel group until all of the corresponding sub-pixels in each sub-pixel group are charged, so that the high-low level conversion frequency of the data lines is reduced when the liquid crystal display panel displays a single color image.

Figure 5:
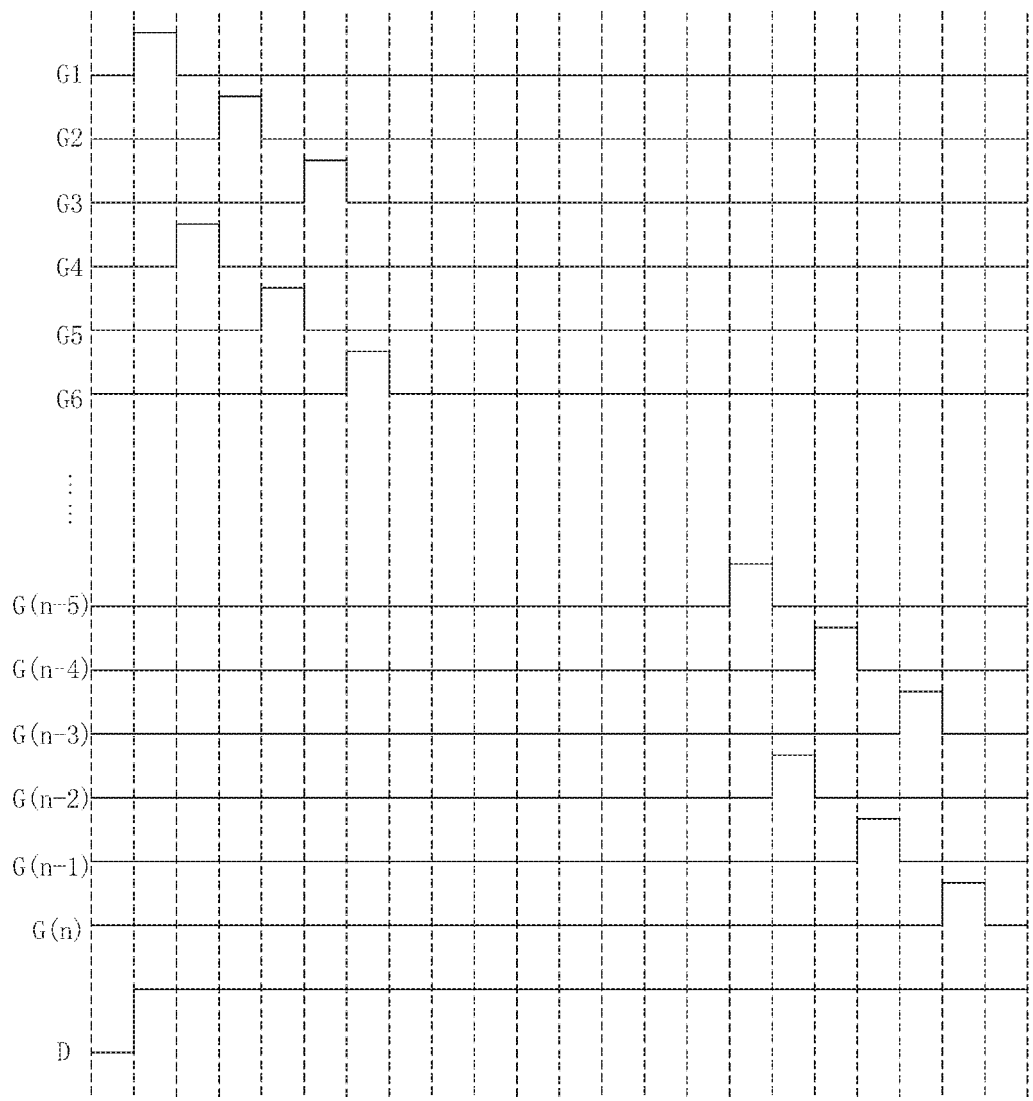
FIG. 5 is a driving waveform of a driving method of a liquid crystal display panel according to the present disclosure.

Specifically, FIG. 5 is a driving waveform of a driving method of a liquid crystal display panel according to the present disclosure. As shown in FIG. 5, when the liquid crystal display panel is driven, all of the scanning lines are turned on in order according to a sequence of the 1st scanning line G1, the 4th line scanning line G4, the 2nd scanning line G2, the 5th scanning line G5, the 3rd scanning line G3, the (n-5)th scanning line G(n-5), the (n-2)th scanning line G(n-2), the (n-4)th scanning line G(n-4), the (n-1)th scanning line G(n-1), the (n-3)th scanning line G(n-3), and the (n)th scanning line G(n), and the sub-pixels of the liquid crystal display panel are charged by the data lines D (only one data line is schematically shown).

Figure 6:
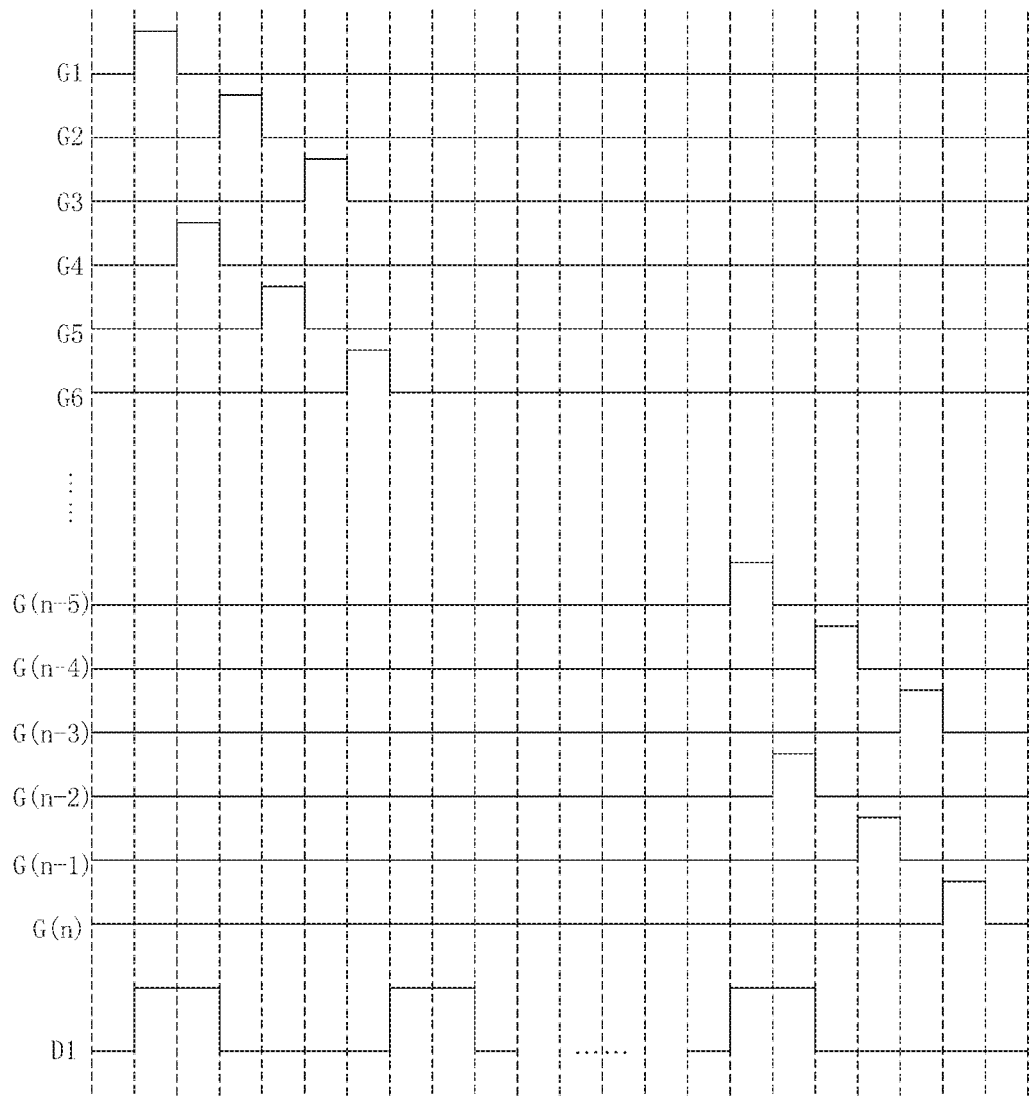
FIG. 6 is a driving waveform of a first color image of the liquid crystal display panel according to the present disclosure.

Furthermore, FIG. 6 is a driving waveform of a first color image of the liquid crystal display panel according to the present disclosure. When the first color image is displayed on the liquid crystal display panel, the data line D1 applies a high level data signal during the scanning lines G(1), G(4), . . . , G(n-5) and G(n-2) connected to the first sub-pixel are turned on and the data line D1 applies a low level data signal when the scanning lines G(2), G(5), G(3), G(6), . . . , G(n-4), G(n-1), G(n-3), G(n) connected to the second sub-pixel and the third sub-pixel are turned on.

When the liquid crystal display panel displays a second color image, the data line applies a high level data signal during the scan lines connected to the second sub-pixel are turned on, and the data line applies a low level data signal when the scanning lines connected to the first sub-pixel and the third sub-pixel connection are turned on.

When the liquid crystal display panel displays a third color image, the data line applies a high level data signal when the scan lines connected to the third sub-pixel are turned on, and the data line applies a low level data signal when the scanning lines connected to the first sub-pixel and the second sub-pixel connection are turned on.

The driving method for a liquid crystal display panel of the present disclosure with a plurality of sub-pixels in the same column are divided into three sub-pixel groups, the three sub-pixel groups comprise a first sub-pixel group composed of the first sub-pixels, a second sub-pixel group composed of the second sub-pixels, and a third sub-pixel group composed of the third sub-pixels; two sub-pixels in each of the sub-pixel groups are sequentially charged in the order of the first sub-pixel group, the second sub-pixel group, and the third sub-pixel group until all of the corresponding sub-pixels in each sub-pixel group are charged, reducing the high-low level conversion frequencies of data lines when the liquid crystal display panel displays a single color image, and reducing the voltage level conversion frequency on the data line and improving the charge capacity of the pixels, thereby improving the display quality of the liquid crystal display panel.

According to another embodiment of the present disclosure, when the liquid crystal display panel is driven, all sub-pixels in each of the sub-pixel groups are sequentially charged in the order of the first sub-pixel group, the second sub-pixel group, and the third sub-pixel group until all of the corresponding sub-pixels in each sub-pixel group are charged, to reduce the high-low level conversion frequencies of data lines.

Specifically, when the liquid crystal display panel is driven, all of the scanning lines are turned on in order according to a sequence of the 1st scanning line G1, the 4th line scanning line G4, . . . , the (n-5)th scanning line G(n-5), the (n-2)th scanning line G(n-2), the 2nd scanning line G2, the 5th scanning line G(5), . . . , the (n-4)th scanning line G(n-4), the (n-1)th scanning line G(n-1), the 3rd scanning line G(3)), the 6th scanning line G(6), . . . , the (n-3)th scanning line G(n-3), and the (n)th scanning line G(n), and the sub-pixels of the liquid crystal display panel are charged by the data lines.

Figure 7:
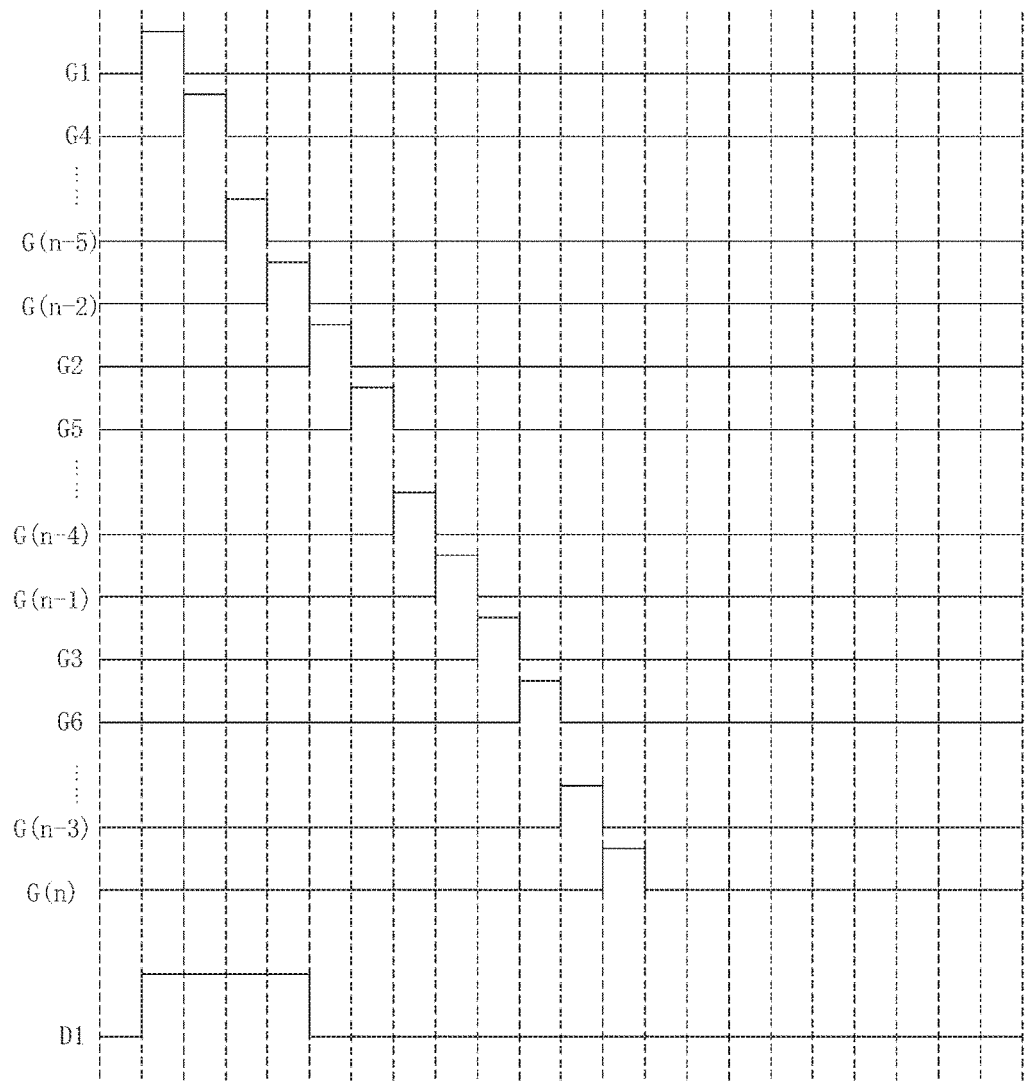
FIG. 7 is a driving waveform of a first color image of the liquid crystal display panel of another preferred embodiment according to the present disclosure.

FIG. 7 is a driving waveform of a first color image of the liquid crystal display panel of another preferred embodiment according to the present disclosure. When the first color image is displayed on the liquid crystal display panel, the data line D1 applies a high level data signal when the scanning lines G(1), G(4), . . . , G(n-5) and G(n-2) connected to the first sub-pixel are turned on and the data line D1 applies a low level data signal when the scanning lines G(2), G(5), G(3), G(6), . . . , G(n-4), G(n-1), G(n-3), G(n) connected to the second sub-pixel and the third sub-pixel are turned on.

When the liquid crystal display panel displays a second color image, the data line applies a high level data signal when the scan lines connected to the second sub-pixel are turned on, and the data line applies a low level data signal when the scanning lines connected to the first sub-pixel and the third sub-pixel connection are turned on.

When the liquid crystal display panel displays a third color image, the data line applies a high level data signal when the scan lines connected to the third sub-pixel are turned on, and the data line applies a low level data signal when the scanning lines connected to the first sub-pixel and the second sub-pixel connection are turned on.

The driving method for a liquid crystal display panel of the present disclosure with a plurality of sub-pixels in the same column are divided into three sub-pixel groups, the three sub-pixel groups comprise a first sub-pixel group composed of the first sub-pixels, a second sub-pixel group composed of the second sub-pixels, and a third sub-pixel group composed of the third sub-pixels; all sub-pixels in each of the sub-pixel groups are sequentially charged in the order of the first sub-pixel group, the second sub-pixel group, and the third sub-pixel group until all of the corresponding sub-pixels in each sub-pixel group are charged, reducing the high-low level conversion frequencies of data lines when the liquid crystal display panel displays a single color image, and reducing the voltage level conversion frequency on the data line and improving the charge capacity of the pixels, thereby improving the display quality of the liquid crystal display panel.

When the first color image is displayed on the liquid crystal display panel, the data line D1 applies a high level data signal when the scanning lines G(1), G(4), . . . , G(n-5) and G(n-2) connected to the first sub-pixel are turned on and the data line D1 applies a low level data signal when the scanning lines G(2), G(5), G(3), G(6), . . . , G(n-4), G(n-1), G(n-3), G(n) connected to the second sub-pixel and the third sub-pixel are turned on.

When the liquid crystal display panel displays a second color image, the data line applies a high level data signal when the scan lines connected to the second sub-pixel are turned on, and the data line applies a low level data signal when the scanning lines connected to the first sub-pixel and the third sub-pixel connection are turned on.

When the liquid crystal display panel displays a third color image, the data line applies a high level data signal when the scan lines connected to the third sub-pixel are turned on, and the data line applies a low level data signal when the scanning lines connected to the first sub-pixel and the second sub-pixel connection are turned on.

The driving method for a liquid crystal display panel of the present disclosure with a plurality of sub-pixels in the same column are divided into three sub-pixel groups, which comprises a first sub-pixel group composed of the first sub-pixel, a second sub-pixel group composed of the second sub-pixel, and a third sub-pixel group composed of the third sub-pixels; K sub-pixels in each of the sub-pixel groups are sequentially charged in the order of the first sub-pixel group, the second sub-pixel group, and the third sub-pixel group until all of the corresponding sub-pixels in each sub-pixel group are charged, reducing the high-low level conversion frequencies of data lines when the liquid crystal display panel displays a single color image, and reducing the voltage level conversion frequency on the data line and improving the charge capacity of the pixels, thereby improving the display quality of the liquid crystal display panel.

Although the present disclosure has been disclosed as preferred embodiments, the foregoing preferred embodiments are not intended to limit the present disclosure. Those of ordinary skill in the art, without departing from the spirit and scope of the present disclosure, can make various kinds of modifications and variations to the present disclosure. Therefore, the scope of the claims of the present disclosure must be defined.

What is claimed is:

1. A driving method for a liquid crystal display panel, wherein the liquid crystal display panel comprises a plurality of sub-pixels arranged in an array, each column of sub-pixels comprise a first sub-pixel, a second sub-pixel and a third sub-pixel sequentially arranged alternately from the first row to the last row, the first sub-pixel for displaying a first color, the second sub-pixel for displaying a second color, and the third sub-pixel for displaying a third color, the driving method comprising:

dividing a plurality of sub-pixels in the same column into three sub-pixel groups, wherein the three sub-pixel groups comprise a first sub-pixel group composed of the first sub-pixels, a second sub-pixel group composed of the second sub-pixels, and a third sub-pixel group composed of the third sub-pixels;

sequentially charging K sub-pixels in each of the sub-pixel groups in the order of the first sub-pixel group, the second sub-pixel group, and the third sub-pixel group until all of the corresponding sub-pixels in each sub-pixel group being charged, reducing high-low level conversion frequencies of data lines when the liquid crystal display panel displays a single color image; wherein K is an integer greater than one;

wherein the first sub-pixel is a red sub-pixel the second sub-pixel is a green sub-pixel, and the third sub-pixel is a blue sub-pixel, wherein the liquid crystal display panel further comprises a plurality of scanning lines and a plurality of data lines, each scanning line is connected with one row of sub-pixels, and each data line is connected with one column of sub-pixels.

2. The driving method for the liquid crystal display panel according to claim 1, wherein when the liquid crystal display panel displays a first color image, the data line applies a high level data signal when the scan lines connected to the first sub-pixel are turned on, and the data line applies a low level data signal when the scanning lines connected to the second sub-pixel and the third sub-pixel connection are turned on.

3. The driving method for the liquid crystal display panel according to claim 1, wherein when the liquid crystal display panel displays a second color image, the data line applies a high level data signal when the scan lines connected to the second sub-pixel are turned on, and the data line applies a low level data signal when the scanning lines connected to the first sub-pixel and the third sub-pixel connection are turned on.

4. The driving method for the liquid crystal display panel according to claim 1, wherein when the liquid crystal display panel displays a third color image, the data line applies a high level data signal when the scan lines connected to the third sub-pixel are turned on, and the data line applies a low level data signal when the scanning lines connected to the first sub-pixel and the second sub-pixel connection are turned on.

5. The driving method for the liquid crystal display panel according to claim 1, wherein a first sub-pixel, a second sub-pixel, and a third sub-pixel sequentially arranged in the same column form a display pixel.

6. The driving method for the liquid crystal display panel according to claim 1, wherein K first sub-pixels in the first sub-pixel group are first sub-pixels arranged successively.

7. The driving method for the liquid crystal display panel according to claim 1, wherein K second sub-pixels in the second sub-pixel group are second sub-pixels arranged successively.

8. The driving method for the liquid crystal display panel according to claim 1, wherein K third sub-pixels in the third sub-pixel group are third sub-pixels arranged successively.

9. A driving method for a liquid crystal display panel, wherein the liquid crystal display panel comprises a plurality of sub-pixels arranged in an array, each column of sub-pixels comprises a first sub-pixel, a second sub-pixel, and a third sub-pixel sequentially arranged alternately from the first row to the last row, the first sub-pixel for displaying a first color, the second sub-pixel for displaying a second color, and the third sub-pixel for displaying a third color, the driving method comprising:

dividing a plurality of sub-pixels in the same column into three sub-pixel groups, wherein the three sub-pixel groups comprise a first sub-pixel group composed of the first sub-pixels, a second sub-pixel group composed of the second sub-pixels, and a third sub-pixel group composed of the third sub-pixels;

sequentially charging K sub-pixels in each of the sub-pixel groups in the order of the first sub-pixel group, the second sub-pixel group, and the third sub-pixel group until all of the corresponding sub-pixels in each sub-pixel group being charged, reducing high-low level conversion frequencies of data lines when the liquid crystal display panel displays a single color image;

wherein K is an integer greater than one.

10. The driving method for the liquid crystal display panel according to claim 9, wherein the first sub-pixel is a red sub-pixel, the second sub-pixel is a green sub-pixel, and the third sub-pixel is a blue sub-pixel.

11. The driving method for the liquid crystal display panel according to claim 9, wherein the liquid crystal display panel further comprises a plurality of scanning lines and a plurality of data lines, wherein each scanning line is connected with one row of sub-pixels, and each data line is connected with one column of sub-pixels.

12. The driving method for the liquid crystal display panel according to claim 11, wherein when the liquid crystal display panel displays a first color image, the data line applies a high level data signal when the scan lines connected to the first sub-pixel are turned on, and the data line applies a low level data signal when the scanning lines connected to the second sub-pixel and the third sub-pixel connection are turned on.

13. The driving method for the liquid crystal display panel according to claim 11, wherein when the liquid crystal display panel displays a second color image, the data line applies a high level data signal when the scan lines connected to the second sub-pixel are turned on, and the data line applies a low level data signal when the scanning lines connected to the first sub-pixel and the third sub-pixel connection are turned on.

14. The driving method for the liquid crystal display panel according to claim 11 wherein when the liquid crystal display panel displays a third color image, the data line applies a high level data signal when the scan lines connected to the third sub-pixel are turned on, and the data line applies a low level data signal when the scanning lines connected to the first sub-pixel and the second sub-pixel connection are turned on.

15. The driving method for the liquid crystal display panel according to claim 9, wherein a first sub-pixel, a second sub-pixel, and a third sub-pixel sequentially arranged in the same column form a display pixel.

16. The driving method for the liquid crystal display panel according to claim 9, wherein K first sub-pixels in the first sub-pixel group are first sub-pixels arranged successively.

17. The driving method for the liquid crystal display panel according to claim 9, wherein K second sub-pixels in the second sub-pixel group are second sub-pixels arranged successively.

18. The driving method for the liquid crystal display panel according to claim 9, wherein K third sub-pixels in the third sub-pixel group are third sub-pixels arranged successively.

* * * * *